United States Patent Office 2,784,192
Patented Mar. 5, 1957

2,784,192

PREPARATION OF 4-HYDROXYPIPERIDINES

Claude J. Schmidle, Moorestown, and Richard C. Mansfield, Haddonfield, N. J., assignors to Rohm & Haas Company, Philadelphia, Pa., a corporation of Delaware No Drawing. Application June 24, 1954,
Serial No. 439,124

7 Claims. (Cl. 260—294.7)

This invention relates to a process for preparing N-substituted 4-hydroxypiperidines, particularly those having a 4-phenyl group. This process comprises reacting by addition anhydrous hydrogen bromide and an N-substituted 1,2,3,6-tetrahydropyridine whereby a bromopiperidine is formed, and reacting said bromopiperidine with water to give the desired 4-hydroxypiperidine.

Although 1-methyl-3-hydroxy-4-phenyltetrahydropyridine has been reported as being hydrated by being refluxed with aqueous hydrobromic acid to give a glycol, it is now found that when N-substituted 1,2,3,6-tetrahydropyridines are heated with aqueous hydrobromic acid no hydration can be observed. In contrast thereto we have found that the monohydric alcohols, 4-piperidinols, can be formed through the steps of reacting with hydrogen bromide under specified conditions followed by hydrolyzing the intermediate product.

We have found that the reaction of an N-substituted-4-phenyl-1,2,3,6-tetrahydropyridine with hydrogen bromide is effected in acetic acid at temperatures between 0° and 75° C., preferably between 10° and 50° C. The reaction mixture is stripped to remove excess hydrogen bromide and to take off acetic acid. The residue is heated with water, preferably at refluxing temperatures, although temperatures from about 75 to 125° C. are suitable. If desired, the hydrolysis may be performed with neutralization of the hydrobromic acid split out.

Dry hydrogen bromide may be passed into an acetic acid solution of the tetrahydropyridine. Alternatively, the tetrahydropyridine may be added to a solution of hydrogen bromide in acetic acid. Such a solution containing 30% to 32% of hydrogen bromide is available commercially.

The preferred tetrahydropyridines are those having an aryl group in the 4-position, particularly the phenyl group or a phenyl group having an inert substituent. Thus, the phenyl group may have a chloro or bromo group or a hydrocarbon substituent such as methyl, ethyl, butyl, octyl, dodecyl, cyclohexyl, phenyl, benzyl, or the like. There may be more than one such group present on the phenyl ring.

As the N-substituent there may be used an inert hydrocarbon group including an alkyl group, preferably of not over four carbon atoms, an aralkyl group, and, of least apparent interest, a cycloalkyl group. Thus, there may be used in the 1-position a methyl, ethyl, propyl, isopropyl, butyl, amyl, hexyl, 2-ethylhexyl, octyl, dodecyl, cyclohexyl, benzyl, methylbenzyl, butylbenzyl group, phenylethyl, or other similar hydrocarbon group. But the N-substituents are not confined to hydrocarbon groups. There may be used any group which is not sensitive to hydrogen bromide, including ether and tertiary amino groups.

A particularly useful N-substituent is that containing an ether group, such as methoxyethyl, ethoxyethyl, propoxyethyl, butoxyethyl, phenoxyethyl, benzoxyethyl, ethoxypropyl, etc. There may also be used substituents having tertiary amino groups, such as dimethylaminoethyl, dibutylaminoethyl, dimethylaminopropyl, diethylaminopropyl, dibutylaminopropyl, etc. Furthermore, the N-substituent may be an alkylene chain connecting tetrahydro pyridine groups, as in N,N'-ethylene bis(4-phenyltetrahydropyridine) or N,N'-propylene bis(4-p-tolyltetrahydropyridine).

While there are several sources of 1,2,3,6-tetrahydropyridines, we have recently discovered a convenient method for preparing these. In it there are utilized 6-alkyl-3-substituted tetrahydro-1,3-oxazines as starting materials. These can be made by reacting an olefin, formaldehyde, and a primary amine in the presence of a hydrohalide as catalyst, as described by Hartough et al. in U. S. 2,647,117. As an olefin there must be here used one which provides an alkyl group in the 6-position of the said oxazine, preferably a methyl group. Suitable olefins are α-methylstyrene, p-methyl-α-methylstyrene, p-butyl-α-methylstyrene, p-chloro-α-methylstyrene, 1-isopropenylnaphthalene, isobutylene, 2-methyl-1-butene, diisobutylene, or the like.

When a 6-alkyl-3-substituted tetrahydro-1,3-oxazine is heated with aqueous hydrochloric or sulfuric acid or other acid stronger than phosphoric acid in an excess over the tetrahydro-1,3-oxazine at temperatures between 75° and 150° C., the starting material is rearranged with dehydration to yield a 1,2,3,6-tetrahydropyridine. Heating is continued until the conversion is substantially complete and the tetrahydropyridine can then be separated after neutralization of the acid in the reaction mixture.

A typical rearrangement is carried out in the following manner. To 73 parts by weight of 3,6-dimethyl-6-phenyltetrahydro-1,3-oxazine is slowly added 100 parts by weight of concentrated hydrochloric acid. The mixture is stirred at 90°–95° C. for three hours, allowed to stand for 16 hours, and stirred at 90°–95° C. for another hour. It is diluted with 300 parts of water and made basic with sodium hydroxide. The liberated basic material is extracted with two 90 part portions of benzene, dried over anhydrous potassium carbonate, stripped, and distilled to give 57 parts of 1-methyl-4-phenyltetrahydropyridine, distilling at 80°–95° C./0.75 mm.

Substitution of hydrobromic acid of 40% strength or of aqueous sulfuric acid for the above hydrochloric acid leads to the same product. In place of the above oxazine other 6-alkyl-3-substituted tetrahydro-1,3-oxazines can be used. In each case a 1,2,3,6-tetrahydropyridine results. Thus, 3-butyl-6-methyl-6-phenyltetrahydro-1,3-oxazine yields 1-butyl-4-phenyl-1,2,3,6-tetrahydropyridine; 3-hexyl-6-phenyl-6-methyltetrahydro-1,3-oxazine gives 1-hexyl-4-phenyl-1,2,3,6-tetrahydropyridine; 3-benzyl-6-methyl-6-phenyltetrahydro-1,3-oxazine yields 1-benzyl-4-phenyltetrahydropyridine; 3-cyclohexyl-6-methyl-6-tolyltetrahydro-1,3-oxazine yields 1-cyclohexyl-4-tolyl-1,2,3,6-tetrahydropyridine; 3-(3-methoxypropyl)-6-methyl-6-phenyltetrahydro-1,3-oxazine yields 1-(3-methoxypropyl)-4-phenyl-1,2,3,6-tetrahydropyridine; etc.

Details of the process of this invention are presented in the following illustrative examples wherein parts are by weight.

*Example 1*

Anhydrous hydrogen bromide was passed into a solution of 11 parts of 1-methyl-4-phenyltetrahydropyridine in 200 parts of glacial acetic acid while the temperature was maintained at 10°–20° C. At the end of two hours the mixture was saturated with hydrogen bromide and its addition was stopped. The mixture was allowed to stand overnight and was stripped to a solid residue under reduced pressure at a maximum temperature of 45° C. The residue was dissolved in 200 parts of water at 30°

C. The solution was heated to 95° C. for two hours, cooled, and made basic with excess aqueous sodium hydroxide solution. The basic material which separated solidified, was removed by filtration, and was recrystallized from heptane to give 8 parts of 1-methyl-4-phenyl-4-hydroxypiperidine, melting at 112–114° C. It had a neutral equivalent of 191 (theory 191).

*Example 2*

A mixture of 10 parts of 1-n-butyl-4-phenyltetrahydropyridine and 200 parts of glacial acetic acid was saturated with anhydrous hydrogen bromide at 10°–20° C. during the course of two hours. After standing overnight, the mixture was stripped under reduced pressure at a maximum temperature of 45° C. to give a dry solid which was then dissolved in 200 parts of water and stirred at 95°–100° C. for two hours. The mixture was cooled and made alkaline with caustic. The material which separated was filtered off and recrystallized twice from heptane to give 7 parts of 1-n-butyl-4-phenyl-4-piperidinol, melting at 89–90° C. The product obtained contained by analysis 77.54% of carbon, 9.68% of hydrogen, and 6.08% of nitrogen. Theoretical values are 77.21%, 9.93% and 6.00% respectively.

In the same way other 1-alkyl-4-phenyl-1,2,5,6-tetrahydropyridines are reacted with anhydrous hydrogen bromide in acetic acid and the resulting products are reacted with water to yield 1-alkyl-4-phenyl-4-piperidinols. The same reaction can be effected with substituents in the phenyl ring.

*Example 3*

A mixture of 10 parts of 1-n-butyl-4-p-tolyltetrahydropyridine and 200 parts of glacial acetic acid was saturated with hydrogen bromide during two hours while the temperature was maintained at 10–20° C. by external cooling. After standing over the week-end, the mixture was stripped under reduced pressure to a dry solid at a maximum temperature of 45° C. The solid was dissolved in 200 parts of water and stirred at 95–100° C. for 2 hours. After being cooled the mixture was made basic with caustic soda solution and extracted with toluene. The toluene extract was dried over anhydrous potassium carbonate, filtered, and stripped free of toluene. The residue crystallized from heptane and was recrystallized to give 6 parts of 1-n-butyl-4-p-tolyl-4-piperidinol, melting at 83–85° C. This compound was found by analysis to contain 77.8% of carbon, 10.12% of hydrogen, and 5.64% of nitrogen. Corresponding theoretical values are 77.68%, 10.19%, and 5.66% respectviely.

*Example 4*

A stirred mixture of 10 parts of 1-n-hexyl-4-phenyltetrahydropyridine and 200 parts of glacial acetic acid was saturated with hydrogen bromide during two hours while the temperature was maintained at 10–20° C. by external cooling. The mixture was allowed to stand overnight and then stripped under reduced pressure at a maximum temperature of 45° C. to a dry solid which was then dissolved in 200 parts of water and stirred at 95–100° C. for two hours. The mixture was cooled and made alkaline with caustic soda solution. The material that separated was filtered off and recrystallized twice from heptane to give 8 parts of 1-n-hexyl-4-phenyl-4-piperidinol melting at 98–100° C. Analysis of the product gave the following values: carbon, 77.81%; hydrogen, 10.53%; and nitrogen, 5.50%. Calculated values are 78.11%, 10.41%, and 5.36% respectively.

*Example 5*

A mixture of 10 parts of 1-benzyl-4-p-tolyltetrahydropyridine and 200 parts of glacial acetic acid was saturated with hydrogen bromide during 2 hours while the temperature was maintained at 10–20° C. by external cooling. After standing overnight, the mixture was stripped under reduced pressure at a maximum temperature of 45° C. to yield a dry solid. The solid was dissolved in 300 parts of water and heated at 95–100° C. for two hours. The mixture was cooled, made basic with caustic soda solution, and extracted with toluene. The toluene extract was dried over anhydrous potassium carbonate, filtered, and stripped free of toluene. The residue crystallized from heptane and was recrystallized to yield 8 parts of 1-benzyl-4-p-tolyl-4-piperidinol, melting at 77–79° C. By analysis the product contained 80.6% of carbon, 8.35% of hydrogen, and 5.03% of nitrogen (theory 81.1%, 8.24%, and 4.98% respectively).

As shown above other than alkyl groups may be used as N-substituents. The benzyl group may carry only inert substituent such as chloro or alkyl. The N-substituent is not confined to hydrocarbon groups but may contain heteroatoms, as has been noted and as will now be illustrated.

*Example 6*

A mixture of 10 parts of 1-(3-methoxypropyl)-4-phenyltetrahydropyridine and 200 parts of glacial acetic acid was saturated with hydrogen bromide during two hours while the temperature was maintained at 10–20° C. by external cooling. After standing overnight, the mixture was stripped under reduced pressure to a dry solid at a maximum temperature of 45° C. The solid was stirred with 200 parts of water at room temperature for 0.5 hour and at 95–100° C. for two hours. After being cooled, the mixture was made basic with caustic soda solution and the liberated basic material was filtered off, recrystallized three times from a toluene-methanol mixture, washed with heptane, and recrystallized from water to yield six parts of 1-(3-methoxypropyl)-4-phenyl-4-piperidinol, melting at 127–129° C. The product contained by analysis 5.75% of nitrogen (theory 5.62%).

*Example 7*

A stirred mixture of 10 parts of 1-allyl-4-p-tolyltetrahydropyridine and 200 parts of glacial acetic acid was saturated with hydrogen bromide during two hours while the temperature was maintained at 10–20° C. by external cooling. The mixture was allowed to stand 3 hours and then stripped to a dry solid under vacum at a maximum temperature of 45° C. The solid was dissolved in 200 parts of water and stirred at 95–100° C. for two hours. After being cooled, the mixture was made basic with caustic soda solution and extracted with toluene. The toluene extract was dried over anhydrous potassium carbonate, filtered, and stripped to yield a residue of 11 parts.

For 1 - allyl - 4 - p - tolyl - 4 - piperidinol the theoretical neutral equivalent is 217. The neutral equivalent for the above residue was found to be 220. It thus appears that the chief product is 1-allyl-4-p-tolyl-4-piperidinol. The product contained by analysis 6.21% of nitrogen (theory 6.06%).

The reaction of this invention is also effective when the tetrahydropyridine ring contains other than the 4-phenyl group, as is illustrated in the next example.

*Example 8*

A mixture of 11 parts of 1-methyl-3-hydroxymethyl-4-phenyltetrahydropyridine and 200 parts of glacial acetic acid was saturated with anhydrous hydrogen bromide at 10–20° C. over the course of 2 hours. The mixture was allowed to stand at room temperature overnight and was stripped to a dry solid under reduced pressure at a maximum temperature of 45° C. The residue was dissolved in 200 parts of water and was heated on a steam bath at 95° C. for 2 hours, cooled, and made basic with excess aqueous sodium hydroxide solution. The material which separated from solution was extracted with a mixture of toluene and ether, dried over anhydrous potassium carbonate, filtered, and the filtrate was stripped of solvent under reduced pressure. A white solid was obtained which was recrystallized from toluene-heptane mixture to give a white solid, melting at 146–148° C. It had a neutral equivalent of 220. The theoretical value for 1-methyl-3-hydroxymethyl-4-piperidinol is 221.

The process of this invention is concerned with reacting in acetic acid an N-substituted-1,2,3-6-tetrahydropyridine, preferably a compound of the structure

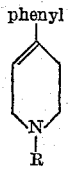

where R is preferably an alkyl group or an aralkyl group, particularly a benzyl group, with anhydrous hydrogen bromide, whereby a bromopiperidine is formed reacting said bromopiperidine with water, and separating a 1-substituted-4-piperidinol, which in preferred cases has a 4-phenyl group. The alcohols thus obtained can act as corrosion inhibitors in acidic systems. Of greater importance, however, is their use as chemical intermediates. They can be reacted, for example, with acid anhydrides to form esters which are unusually potent analgesics.

We claim:

1. A process for preparing 1-substituted-4-phenyl-4-piperidinols which comprises reacting between 0° and 75° C. in acetic acid a 1-substituted-4-phenyl-1,2,3,6-tetrahydropyridine with anhydrous hydrogen bromide to form the corresponding bromopiperidine and reacting between 75° and 125° C. said bromopiperidine with water, there being in the 1-position an N-substituent from the class consisting of alkyl groups of not over 12 carbon atoms, benzyl, allyl, phenoxyalkyl, benzyloxyalkyl, and lower alkoxyalkyl groups wherein the alkyl portion attached to the 1-position contains two to three carbon atoms with at least two in the chain between oxygen and nitrogen.

2. A process which comprises reacting between 0° and 75° C. in acetic acid a 1-alkyl-4-phenyl-1,2,3,6-tetrahydropyridine with anhydrous hydrogen bromide to form the corresponding bromopiperidine, reacting between 75° C. and 125° C. said bromopiperidine with water, and separating a 1-alkyl-4-phenyl-4-piperidinol, the 1-alkyl group being lower alkyl.

3. A process which comprises reacting between 0° and 75° C. in acetic acid 1-methyl-4-phenyl-1,2,3,6-tetrahydropyridine with anhydrous hydrogen bromide to form the corresponding bromopiperidine, reacting between 75° and 125° C. said bromopiperidine with water, and separating 1-methyl-4-phenyl-4-piperidinol.

4. A process which comprises reacting between 0° and 75° C. in acetic acid 1-butyl-4-phenyl-1,2,3,6-tetrahydropyridine with anhydrous hydrogen bromide to form the corresponding bromopiperidine, reacting between 75° and 125° C. said bromopiperidine with water, and separating 1-butyl-4-phenyl-4-piperidinol.

5. A process which comprises reacting between 0° and 75° C. in acetic acid 1-benzyl-4-phenyl-1,2,3,6-tetrahydropyridine with anhydrous hydrogen bromide to form the corresponding bromopiperidine, reacting between 75° and 125° C. said bromopiperidine with water, and separating 1-benzyl-4-phenyl-4-piperidinol.

6. A process which comprises reacting between 0° and 75° C. in acetic acid 1-butyl-4-p-tolyl-1,2,3,6-tetrahydropyridine with anhydrous hydrogen bromide to form the corresponding bromopiperidine, reacting between 75° and 125° C. said bromopiperidine with water, and separating 1-butyl-4-p-tolyl-4-piperidinol.

7. A process which comprises reacting between 0° and 75° C. in acetic acid 1-(3-methoxypropyl)-4-phenyl-1,2,3,6-tetrahydropyridine with anhydrous hydrogen bromide to form the corresponding bromopiperidine, reacting between 75° and 125° C. said bromopiperidine with water, and separating 1-(3-methoxypropyl)-4-phenyl-4-piperidinol.

No references cited.